(12) United States Patent
Mason et al.

(10) Patent No.: US 10,040,897 B2
(45) Date of Patent: *Aug. 7, 2018

(54) AMINO BENZOATES OR BENZAMIDES AS CURING AGENTS FOR EPOXY RESINS

(71) Applicants: Hexcel Composites Limited, Duxford (GB); Hexcel Corporation, Dublin, CA (US)

(72) Inventors: Chris Mason, Duxford (GB); Martin Simmons, Duxford (GB); Yen-Seine Wang, San Ramon, CA (US)

(73) Assignees: Hexcel Composites, Duxford (GB); Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/110,927

(22) PCT Filed: Feb. 6, 2015

(86) PCT No.: PCT/EP2015/052534
§ 371 (c)(1),
(2) Date: Jul. 11, 2016

(87) PCT Pub. No.: WO2015/118117
PCT Pub. Date: Aug. 13, 2015

(65) Prior Publication Data
US 2016/0369043 A1    Dec. 22, 2016

(30) Foreign Application Priority Data
Feb. 6, 2014 (GB) .................................. 1402053.1

(51) Int. Cl.
| | | |
|---|---|---|
| C08L 63/00 | (2006.01) | |
| C08G 59/50 | (2006.01) | |
| C08G 59/54 | (2006.01) | |
| C08K 7/02 | (2006.01) | |

(52) U.S. Cl.
CPC ......... C08G 59/5033 (2013.01); C08G 59/54 (2013.01); C08K 7/02 (2013.01); C08L 63/00 (2013.01)

(58) Field of Classification Search
CPC ..... C08G 59/54; C08G 59/5033; C08L 63/00; C08K 7/02

USPC .......................................... 523/400; 525/523
See application file for complete search history.

(56) References Cited

U.S. PATENT DOCUMENTS

| | | | |
|---|---|---|---|
| 4,661,559 A | | 4/1987 | Gardner et al. |
| 4,975,471 A | * | 12/1990 | Hayase .................. C08G 59/40 522/100 |
| 5,026,872 A | | 6/1991 | Kohli |
| 7,754,322 B2 | | 7/2010 | Tilbrook et al. |
| 2010/0229517 A1 | | 9/2010 | Fujihara |
| 2011/0305863 A1 | | 12/2011 | Morooka |
| 2012/0088863 A1 | | 4/2012 | Wang |
| 2012/0088864 A1 | | 4/2012 | Wang |
| 2012/0097435 A1 | | 4/2012 | Goshima et al. |
| 2016/0152785 A1† | | 6/2016 | Ueno |

FOREIGN PATENT DOCUMENTS

| | | |
|---|---|---|
| CA | 2088193 A1 | 7/1993 |
| EP | 0132853 A1 | 2/1985 |
| EP | 0133281 A2 | 2/1985 |
| EP | 0462060 A2 | 6/1991 |
| EP | 2426557 A1 | 3/2012 |
| JP | 2135217 A | 5/1990 |
| JP | 2013-145275 † | 1/2015 |
| WO | 2011/083329 A2 | 7/2011 |
| WO | 2015/005411 A1 † | 1/2015 |

OTHER PUBLICATIONS

3rd Party Observations under Article 115 EPC, Re: EPA No. 15703073.5, Jul. 11, 2017.
Product Sheet—Mitsui Chemicals America, Inc, "New Aromatic Diamines for use in Polyimide and Polyamide applicationss", pp. 1-3, Dec. 18, 2013.
Jahromi et al. "Liquid Crystalline Epoxide Thermosets", Mol. Cryst. Liq. Cryst., 1994, vol. 250, pp. 209-222.
JP2135217A—DWPI—Abstract, 1990.

\* cited by examiner
† cited by third party

*Primary Examiner* — David T Karst
(74) *Attorney, Agent, or Firm* — W. Mark Bielawski; David J. Oldenkamp

(57) ABSTRACT

Amino benzoates have been found to be useful curing agents for epoxy resins particularly para amino benzoates containing at least two primary amine groups and at least two carboxyl moieties, the amino benzoates are particularly useful as curatives in prepregs.

3 Claims, No Drawings

AMINO BENZOATES OR BENZAMIDES AS CURING AGENTS FOR EPOXY RESINS

The present invention relates to curatives for epoxy resins, their use in curing epoxy resins, in uncured epoxy resins containing the curatives, in epoxy resins cured by the curatives and in articles made therefrom in particular fibre reinforced epoxy resin articles. Epoxy resins find widespread use as thermosetting resins in many applications. They are employed as the thermosetting matrix in prepregs consisting of fibres embedded in the thermosetting matrix. They may also be employed in coatings or in reinforcing foams all of which find applications in a wide variety of industries such as the aerospace, automotive, electronics, construction, furniture, green energy and sporting goods industries.

A wide range of epoxy resins are readily available and are available according to the properties required for processing and curing the epoxy resin as well as their reactivity as required for particular applications. For example, prior to cure the resins may be solid, liquid or semi-solid at ambient temperature and may have varying reactivity according to the use to which they are to be put. The reactivity of an epoxy resin is often measured in terms of its epoxy equivalent weight which is the molecular weight of the resin that contains a single reactive epoxy group. The lower the epoxy equivalent weight the more reactive the epoxy resin.

Different reactivities are required for different uses of epoxy resins but the typical use of an epoxy resin whether it be as the matrix of a fibre reinforced prepreg, an adhesive coating, a structural adhesive is that it is cured by heating. The curing reaction of an epoxy resin usually takes place at elevated temperature and is usually stimulated by a curing agent which controls the cure cycle. The curing is typically an exothermic reaction which needs to be controlled to prevent overheating of the resin which can damage the resin itself, or any substrates with which it is used or the moulds in which it may be cured. There is therefore a need to control and preferably reduce the enthalpy of the curing reaction of epoxy resins.

Curing agents are used in order to activate and control the curing of epoxy resins to provide the required cure temperature/time cycle, to control the exotherm of the cure and to obtain the properties of the final cured resin. A wide range of curing agents for epoxy resins have been proposed and are widely used. For example, amines such as dicyandiamide is a widely used curing agent as are sulfones such as diamino diphenyl sulfone.

Articles comprising fibre reinforced epoxy resins are typically a fibrous material embedded in a matrix of cured epoxy resin. The articles are usually prepared by shaping the fibrous material and the uncured epoxy resin in a mould and then curing the epoxy resin by heating. There are two main processes that can be used, a process employing what is known as a prepreg in which the fibrous material is first impregnated with the uncured epoxy resin to produce the prepreg, and one or more layers of the prepreg are then placed in a mould and moulded to the desired shape within the mould and the system then cured. The second process is known as an infusion process where one or more layers of a resin free fibrous material is placed in a mould and infused or injected with the epoxy resin within the mould before or after shaping and the system then cured.

Both processes have advantages and disadvantages and the selection of the process to be used depends upon the article to be produced. There are also different requirements for the epoxy resin systems that are used in prepregs and for infusion.

For example an infusion resin should have a low viscosity at the injection temperatures to allow infusion of a dry fibre reinforcement preform (typically in the range of from 80 to 130° C. for aerospace grade resins). In contrast, a prepreg resin should have a higher viscosity at these temperatures to ensure that the preimpregnated fibre reinforcement remains impregnated during storage, transport, handling and lay-up of the prepreg.

Additionally, a prepreg cure schedule typically includes an initial low temperature phase (above room temperature but below curing temperature) to allow the resin to reduce in viscosity so that it will flow to consolidate the preform lay-up. The temperature is then increased to cure the resin.

In an infusion process, following infusion of the preform at the injection temperature, the temperature of the infusion resin is increased to the cure temperature to cure the resin.

Furthermore, an infusion resin is generally prepared where it is used in the moulding process by mixing resins and curatives shortly before it is infused into the fibrous material which may already be formed or may subsequently be formed. The resin is then cured. Infusion must be completed within 1 to 3 hours otherwise the resin will have pre-reacted and the viscosity of the resin will have increased preventing effective infusion of the fibrous material. Infusion resins are generally reactive and it is not possible to store the infusion resin for any length of time because it will react and cure. On the other hand, a prepreg resin is designed to remain stable and have a very low rate of cure at low temperatures (typically 40° C. or less) for a long period of time, typically 3 weeks up to 6 months to allow for storage and transportation of the prepreg.

There are also hybrid forms of infusion and prepreg technology. In the hybrids the resin is in the form of a highly viscous resin film which is located within a lay-up of dry fibrous reinforcement. Again the temperature is first raised to an initial temperature to reduce the viscosity of the resin film which allows it to flow and impregnate the reinforcement. The resin temperature is then further increased to cure the resin.

The choice of the curative used for curing the epoxy resin will depend upon which process is to be used to produce and process the fibre, the nature of the uncured epoxy resin system and on the required cure cycle. For example, when the epoxy resin system is to be used in the infusion process the curing agent should not undesirably increase the viscosity of the liquid epoxy resin used for infusion as this could make infusion more difficult requiring greater energy to accomplish infusion and/or leading to unhomogeneous distribution of the liquid epoxy resin throughout the fibrous structure. Since prepregs are often produced in one location and used in another and may be transported and stored between production and use the curing agent used for the epoxy resin system of a prepreg should not therefore be active at low temperatures as this could cause premature curing of the resin and the resin containing the curing agent should have a long outlife at room temperature (storage time without undesirable pre-reaction). Liquid curing agents may be used in infusion systems and solid curing agents are often used in prepregs.

The requirements of a curing agent for epoxy resins are that it is soluble in the epoxy resins with which it is used at temperatures involved during the cure cycle and that it is easily mixed with the epoxy resin to provide a uniform dispersion of the curing agent throughout the resin. Additionally the curing agent should be activated to provide the desired time/temperature cure cycle for the fibre/epoxy resin system, particularly to provide fast cure but with a low enthalpy of the curing reaction. Furthermore the curing agent should be compatible with other additives such as tougheners that may be included in the system.

There is therefore a continuing need to improve fibre reinforced epoxy resins articles and to find new curing agents that can be used to improve the manufacture and properties of such articles.

The present invention aims to mitigate and/or obviate the above described problems and/or to provide improvements generally.

According to the invention there is provided a use, a resin, an epoxy system and a component as defined in any one of the accompanying claims.

Examples of properties that we seek to improve are moisture resistance, retention of Tg of the cured resin when subject to heat and/or moisture, improved compression and toughenability. As with many systems it is necessary to obtain the optimum balance of properties and the suitability of the curing agent is governed not only by the manufacturing process to be used but the properties required of the finished cured article.

We have found that amino benzoates are useful candidates as curing agents for epoxy resins and can be selected to provide systems which can be readily manufactured according to the manufacturing process to be used. In particular we have found that they can be used to obtain satisfactory cure with a reduced enthalpy of reaction and are particularly useful curing agents for the manufacture of articles by the prepreg process as they result in resins that have a long outlife due to a low level of preaction at room temperature providing improved storage stability. We have also found that the use of the amino benzoates as curing agents provides epoxy resin systems having a long outlife such as 1 to 20 weeks, preferably 2 to 6 weeks at room temperature. The systems can also have a low onset of cure temperature enabling the use of a lower cure temperature and/or a shorter cure time.

The present invention therefore provides the use of amino benzoates and/or amino benzamides as curing agents for epoxy resins to reduce the enthalpy of the curing reaction. The invention further provides an epoxy resin containing an amino benzoate and/or amino benzamides. Additionally the invention provides an epoxy resin cured by an amino benzoate and/or an amino benzamide and articles made from such a cured resin. Although not limited to such. In each instance the epoxy resin may be the matrix employed with a fibrous reinforcement.

The standard for the enthalpy of reaction is taken as the enthalpy when using the same count of diamino diphenyl sulfone as curing agent and we have found that the use of the amino benzoates according to this invention can reduce the enthalpy of the curing reaction by from 150-200 joules/gram.

Epoxy resins are usually employed in formulations containing other additives according to the nature of the use envisaged for the cured epoxy resin. Additives including toughening agents, rubbers, core shell polymers, fillers, optionally blowing agents and the like can be included in the formulations. In order to prepare the epoxy resin formulation it is necessary to produce a homogenous or substantially homogeneous mixture of the various ingredients. In particular it is important that the curing agent be well dispersed throughout the epoxy resin in order to obtain uniform curing of the formulation upon heating so that uniform properties, particularly mechanical properties, are obtained in the cured epoxy resin. Additionally, it is desirable that the formulations can be prepared at temperatures where premature activation of the curing agent and cross linking of the epoxy resin does not occur. It is also preferred that from an economic perspective the formulations can be prepared at low temperatures to reduce the costs of heating the mixtures during compounding of the formulation. The amino benzoate will therefore be selected according to the epoxy resin system that is to be cured.

In manufacturing using the prepreg process curable epoxy resin formulations are usually prepared in one location for transport to another location where they are cured to produce a finished article. For example, a prepreg comprising a fibrous reinforcement embedded in an epoxy resin matrix can be made in one location and shipped to another location for moulding for example, into wind turbine blades, automobile or aerospace components, sporting goods and the like. It may also be necessary to store the materials for some time prior to use. It is therefore also important that the formulation is storage stable under ambient conditions (temperature and humidity) and that there is substantially no pre-reaction of the epoxy resin or preactivation of the curing agent during storage and/or transportation of the resin formulation whether as the formulation itself or in structures such as prepregs. The amino benzoate can be selected to satisfy this requirement.

Amino benzoates and/or amino benzamides can be readily formulated with the epoxy resin to provide a storage stable epoxy resin based formulation whether on its own or as part of a structure and they can be also used to control the cure cycle of an epoxy resin containing formulation.

In preferred formulations the epoxy resin has a functionality at least 2 and has a high reactivity. The epoxy equivalent weight (EEW) of the resin is preferably in the range from 80 to 1500, preferably of from 80 to 500. Suitable epoxy resins may comprise blends of two or more epoxy resins selected from monofunctional, difunctional, trifunctional and/or tetrafunctional epoxy resins. Amino benzoates and/or amino benzamides are particularly useful with epoxy resins that are liquid at ambient temperature.

Difunctional epoxy resins with which the amino benzoates may be used include those based on: diglycidyl ether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol digicidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol, diglycidyl ether of bisphenol A, diglycidyl dihydroxy naphthalene, or any combination thereof.

Trifunctional epoxy resins with which the amino benzoates and/or amino benzamides may be used include those based upon phenol and cresol epoxy novolacs, glycidyl ethers of phenol-aldehyde adducts, aromatic epoxy resins, aliphatic triglycidyl ethers, dialphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Material (Monthey, Switzerland) under the tradenames MY0500 and MY0510 (triglycidyl para-aminophenol) and MY0600 and MY0610

(triglycidul meta-aminophenol). A triglycidyl meta-aminophenol is also available from Sumitomo Chemical Co. (Osaka, Japan) under the tradename ELM-120.

Tetrafunctional epoxy resins with which amino benzoates and/or amino benzamides may be used include N,N,N,$^1$,N$^1$-tetraglycidyl-m-xylenediamine (available commercially from Mitsubishi Gas Chemical Company under the name Tetrad-X, and as Erisys GA-240 from CVC Chemicals), and N,N,N$^1$,N$^1$-tetraglycidylmethylenedianline (e.g. MY720 and MY721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The epoxy resin formulation of the present invention comprising the epoxy resin and the amino benzoate and/or amino benzamides may also include a thermoplastic component that is soluble in the epoxy resin and acts as a toughening agent. Any suitable soluble thermoplastic polymer that has been used as toughening agent may be used. Typically, the thermoplastic polymer is added to the resin mix as particles that are dissolved in the resin mixture by heating prior to addition of any insoluble particles and the curing agent. Once the thermoplastic agent is substantially dissolved in the hot matrix resin precursor (i.e. the blend of epoxy resins), the precursor is cooled and the remaining ingredients (curing agent and insoluble particles) are added.

Exemplary thermoplastics that can be used as the soluble thermoplastic component include any polyethersulfone, polyetherimide and polysulphone which are soluble in the epoxy resin.

Polyethersulfone (PES) is preferred for use as the soluble thermoplastic component. PES is sold under the trade name Sumikaexcel 5003P, which is commercially available from Sumitomo Chemicals. Alternatives to 5003P are Solvay polyethersulphone 105RP, or the non-hydroxyl terminated grades such as Solvay 1054P. It is preferred that the uncured resin formulation include from 10 to 30 weight percent of the thermoplastic component. More preferred are uncured resin formulations that contain from 12 to 20 wt % soluble thermoplastic component. Most preferred are resin formulation that contain from 13 to 18 wt % soluble thermoplastic component.

The uncured resin formulation may also include an insoluble particle component that is composed of a combination of elastic particles and rigid particles. The amount of insoluble particles in the uncured resin formulation is preferably from 5 to 30 wt %. More preferred are resin formulations that contain from 10 to 25 wt % insoluble particles. Most preferred are resin formulations that contain form 10 to 22 wt % insoluble particles.

Examples of suitable particles include polyamideimide (PAI) and polyamide (PA). Rigid particles have glass transition temperatures ($T_g$) that are above room temperature (22° C.). Rigid particles are harder than the elastic particles. In addition, rigid particles are not as easily deformed as the elastic particles. Rigid particles have a Young's modulus of between 100 and 1000 ksi. Preferably, the Young's modulus of the rigid particles is between 200 and 800 ksi.

Polyamide particles come in a variety of grades that have different melting temperatures depending upon the particular polyamide and the molecular weight of the polyamide. Polyamide particles used in the formulations of the present invention preferably have melting points of above 190° C. and below 240° C. This is well above typical epoxy curing temperatures. So that little, if any, dissolution of the particles occurs during cure. It is preferred that the polyamide particles have a Young's modulus of between 200 and 400 ksi with a modulus of about 300 ksi being particularly preferred.

Suitable polyamide particles contain polyamide 6 (caprolactamz—PA6) as the main ingredient, but may also contain minor amounts of polyamide 12 (laurolactame—PA 12), polyamide 11, provided that the melting temperature of the particle remains above the cure temperature of the resin formulation. The particles should have particle sizes of below 100 microns. It is preferred that the particles range in size from 5 to 60 microns and more preferably from 10 to 30 microns. It is preferred that the average particle size be around 20 microns. The particles can be made by anionic polymerization in accordance with PCT application WO2006/051222, by co-extrusion, precipitation polymerization, emulsion polymerization or by cryogenic grinding. Suitable polyamide particles that may be used as rigid particles are available commercially from Arkema of France under the trade name Orgasol or Rilsan.

It is preferred that the resin formulation include PA particles and that the amount of PA particles be in the range of 5 to 25 wt % of the total resin formulation. More preferred are PA particle amounts in the range of 10-20 wt %.

Suitable PAI particles are available commercially as TORLON 4000T or TORLON 4000TF from Solvay Advanced Polymers (Alpharetta, Ga.). The preferred average particle size range for the PAI particles is from 8 microns to 20 microns. PAI particles have a Young's modulus of about 600 ksi. It is preferred that the resin formulation include PAI particles and that the amount of PAI particles be in the range of 5 to 25 wt % of the total resin matrix. More preferred are PAI particle amounts in the range of 10 to 20 wt %.

Examples of suitable elastic particles include particles that are composed principally of polyurethane. The particles should contain at least 95 wt % polyurethane polymer. Other elastic particles that are composed of a high molecular weight elastomer that is insoluble in epoxy may also be used. The Young's modulus of elastic particles should be below 10 ksi. The Tg of elastic particles should be at room temperature (22° C.) or below.

Polyurethane particles that contain a small amount (less than 5 wt %) of silica are a preferred type of elastic particle. Polyurethane particles that are available from Aston Chemicals (Aylesbury, UK) under the trade name SUNPU-170 are a preferred type of polyurethane particle. SUNPU-170 is composed of HDI/Trimethylol Hexyllactone Crosspolymer, Silica. The particles contain about 95 to 99 wt % urethane polymer and 1 to 5 wt % silica. The particles are microspheres that range in diameter from 5 microns to 20 micron. Suitable polyurethane particles are also available from Kobo Products (South Plainfield, N.J.) under the trade name BPD-500, BP-500T and BP-500W. These particles are also composed of HDI/Trimethylol hexyllactone Crosspolymer and silica. The particles are also microspheres that range in size from 10 microns to 15 microns. The BPD-500 microspheres contain from 1 to 3 wt % silica and from 97 to 99 wt % polyurethane.

Other suitable thermoplastic particles include copolyamides, polyimides, aramids, polyketones, polyetheretherketones, polyarylene ethers, polyesters, polyurethanes, polysulphones.

The uncured resin formulation may also include at least one other curing agent in addition to the amino benzoates and/or amino benzamides. Suitable additional curing agents are those which facilitate the curing of the epoxy-functional compounds and, particularly, facilitate the ring opening polymerization of such epoxy compounds.

Suitable additional curing agents include anhydrides, particularly polycarboxylic anhydrides, such as nadic anhydride (NA), methylnadic anhydride (MNA—available from Aldrich), phthalic anhydride, tetrahydrophthalic anhydride, hexahydrophthalic anhydride (HHPA—available from Anhydrides and Chemicals Inc., Newark, N.J.), methyltetrahydrophthalic anhydride (MTHPA—available from Anhydrides and Chemicals Inc.), methylhexahydrophthalic anhydride (MHHPA—available from Anhydrides and Chemicals Inc.), endomethylenetetrahydrophthalic anhydride, hexachloroendomethylene-tetrahydrophthalic anhydride (Chlorentic Anhydride—available from Velsicol Chemical Corporation, Rosemont, 111.), trimellitic anhydride, pyromellitic dianhydride, maleic anhydride (MA—available from Aldrich), succinic anhydride (SA), nonenylsuccinic anhydride, dodecenylsuccinic anhydride (DDSA—available from Anhydrides and Chemicals Inc.), polysebacic polyanhydride, and polyazelaic polyanhydride.

Further suitable additional curing agents are the amines, including other aromatic amines, e.g., 1,3-diaminobenzene, 1,4-diaminobenzene, 4,4'-diamino-diphenylmethane, and the polyaminosulphones, such as 4,4'-diaminodiphenyl sulphone (4,4'-DDS—available from Huntsman), 4-aminophenyl sulphone, and 3,3'-diaminodiphenyl sulphone (3,3'-DDS), dicyanpolyamides such as dicyandiamide (DICY), and imidazoles.

Suitable additional curing agents may also include polyols, such as ethylene glycol (EG—available from Aldrich), poly(propylene glycol), and polyvinyl alcohol); and the phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400, these being available as HRJ 2210, HRJ-2255, and SP-1068, respectively, from Schenectady Chemicals, Inc., Schenectady, N.Y.). Further as to phenol-formaldehyde resins, a combination of CTU guanamine, and phenol-formaldehyde resin having a molecular weight of 398, which is commercially available as CG-125 from Ajinomoto USA Inc. (Teaneck, N.J.), is also suitable.

Curing agent accelerators may also be included and suitable curing agent accelerators are any of the urone compounds that have been commonly used. Specific examples of accelerators, which may be used alone or in combination, include N,N-dimethyl, N'-3,4-dichlorphenyl urea (Diuron), N'-3-chlorophenyl urea (Monuron), and preferably N,N-(4-methyl-m-phenylene bis[N',N'-dimethylurea] (e.g. Dyhard UR500 available from Degussa).

The uncured resin formulation may also include additional ingredients, such as performance enhancing or modifying agents and additional thermoplastic polymers provided they do not adversely affect the tack and outlife of the formulation or the strength and damage tolerance of cured composite parts obtained from the formulation. The performance enhancing or modifying agents, for example, may be selected from flexibilizers, toughening agents/particles, accelerators, core shell rubbers, flame retardants, wetting agents, pigments/dyes, UV absorbers, anti-fungal compounds, fillers, conducting particles, and viscosity modifiers.

The para amino benzoates or amino benzamides used in this invention may be ortho, meta or para amino benzoates and are compounds of the formula (1)

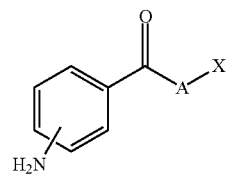

wherein A is oxygen or nitrogen and X is selected according to the manufacturing process employed in the resin and fibre/uncured resin system, the cure cycle and the properties required of the cured resin such as those required in the final fibre reinforced article such as an automotive or aerospace component, a wind turbine blade or a ski. X may comprise an aliphatic, cycloaliphatic or aromatic structure which may be substituted or unsubstituted and/or combinations of these structures.

We have found that amino benzoates and/or amino benzamides containing at least two amino groups, particularly primary amino groups are especially useful as curing agents for epoxy resins. We have found in particular that such amino benzoates and/or amino benzamides are not prone to preaction at room temperature so providing a storage stable epoxy resin system prepreg and yet can be used to cause the epoxy resin to cure at temperatures traditionally used to produce automotive or aerospace components, wind turbine blades or skis.

We particularly prefer to use para amino benzoates containing at least two amino benzoate moieties that are linked such as compounds of the formula (2).

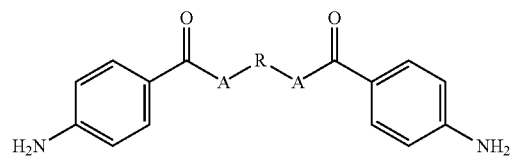

where R is an alkyl, cycloaliphatic or aromatic linking group and A is as previously defined.

Specifically we prefer to use materials selected from the following group

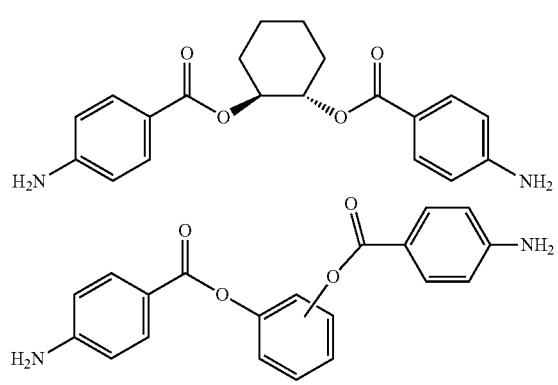

1,2-,1,3-,1,4-pBABB

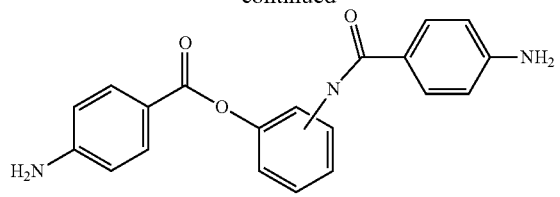

1,2-,1,3-,1,4-pBABAB

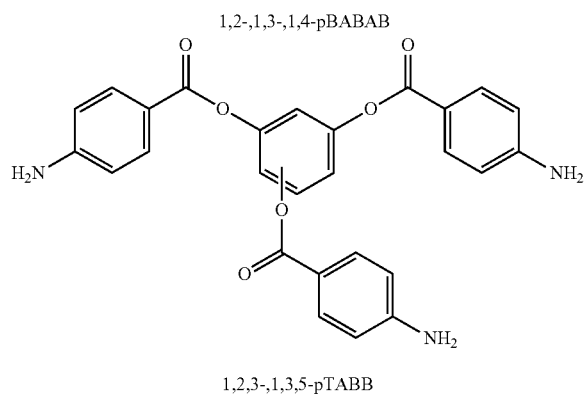

1,2,3-,1,3,5-pTABB and the ortho and meta counterparts where the amine is in the ortho or meta position. Where the compounds contain two or more amino benzoate moieties the amine group may be in a different position to different moieties.

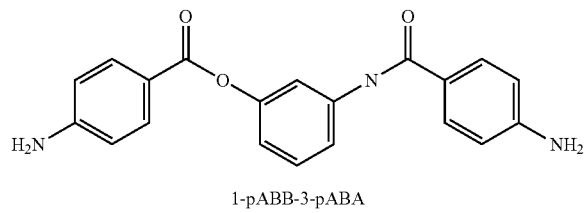

1-pABB-3-pABA is an example of a compound in which with reference to (2) one A is nitrogen and one is oxygen provide a mixed amino benzamide/amino benzoate.

Some of these compounds are believed to be novel compounds.

We have also found that compounds containing at least two amino benzoate or amino benzamide moieties may be readily prepared using the synthesis route as shown below.

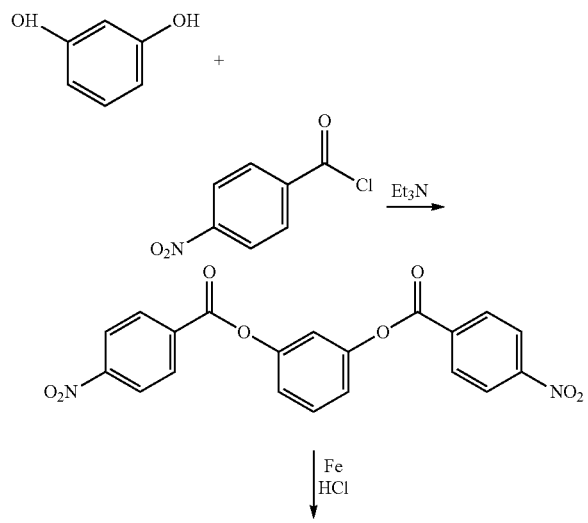

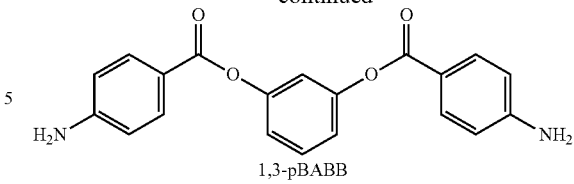

1,3-pBABB

Uncured epoxy resin formulations of the present invention may be used in a wide variety of situations where they can be cured to form an article comprising the desired cured epoxy resin. Although the uncured epoxy resin compositions may be used alone, the formulations of this invention are generally combined with a fibrous support to form composite materials and the epoxy resin formulations may be used in the formation of prepregs or in the infusion process although the use in prepregs is preferred. The amino benzoates are particularly useful curing agent when the composite materials are in the form of a prepreg, partially cured prepreg or a completely cured final part. Prepreg is the term used to describe fibre reinforced materials embedded in a matrix of uncured epoxy resin. The fibrous reinforcement may be carbon fibre, glass fibre or aramid and may be continuous, woven or unwoven or short fibre. The term "uncured", when used herein in connection with prepreg, formulation resin or composite material, is intended to covers items that may have been subjected to some curing, but which have not been completely cured to form the final composite part or structure.

Although not preferred, the amino benzoates and/or amino benzamides may be used as curatives in epoxy resin systems used in the infusion process. In the infusion process the uncured resin composition comprising the epoxy resin, the amino benzoate and/or amino benzamides and optionally other components are drawn into the reinforcing material, for example fibres or a fabric, located in a mould. Typically a vacuum is used to draw the resin composition through a stack of the reinforcing material. The speed and distance of the infusing of the stack are dependent on the permeability of the stack, the pressure gradient acting on the infused resin and the viscosity of the resin composition. Suitably the resin is drawn through the reinforcing stack at a temperature of 80-120° C. Once the resin has been drawn through the reinforcing material, the temperature is raised typically to around 150 to 190° C. to cure the resin.

Such composite materials may be used for any intended purpose, they are extremely useful in automotive and aerospace vehicles and particularly preferred for use in commercial and military aircraft. For example, the composite materials may be used to make non-primary (secondary) aircraft structures. However the preferred use of the composite material is for structural applications, such as primary aircraft structures. Primary aircraft structures or parts are those elements of either fixed-wing or rotary wing aircraft that undergo significant stress during flight and which are essential for the aircraft to maintain controlled flight. The composite materials may also be used for other structural applications to make load-bearing parts and structures in general, for example they may be used in the spar or blades of wind turbine and in sporting goods such as skis.

Where the amino benzoates and/or amino benzamides are used as curing agents in preimpregnated composite material, the materials are composed of reinforcing fibres and the uncured resin formulation acts as a matrix to contain the fibres. The reinforcing fibres can be any of the conventional fibre configurations that are used in the prepreg industry. The matrix includes an epoxy resin component which may include difunctional epoxy resins, but preferably includes a combination of trifunctional and tetrafunctional aromatic epoxy resins. The resin matrix for such a use preferably further includes a soluble thermoplastic component and an insoluble particulate component and a curing agent.

The uncured resin formulation of this invention may be made in accordance with standard processing, the epoxy resins may be mixed together at room temperature or above (depending upon resin viscosities) to form a resin mix to which the thermoplastic component is added. This mixture is then heated to an elevated temperature (typically around 120° C.-130° C.) for a sufficient time to substantially dissolve the thermoplastic(s). The mixture is then cooled down to around 80° C.-90° C. or below (depending upon the viscosity of the mixture) and the insoluble thermoplastic particles and other additives, if any, are then mixed into the resin. The resin is then further cooled to around 70° C.-80° C. or below, if necessary, and the amino benzoate and any other curing agents and optionally curing agent accelerators are added to form the final formulation which may then be impregnated into the fibre reinforcement. In a preferred process, once the soluble thermoplastic has been dissolved, the mixture is cooled to around 80° C. and all of the remaining ingredients, including the amino benzoate curing agent are added.

The reinforcing fibres used in this invention may be synthetic or natural fibres or any other form of material or combination of materials that, combined with the resin composition of the invention, forms a composite product. The reinforcement web can either be provided via spools of fibre that are unwound or from a roll of textile. Exemplary fibres include glass, carbon, graphite, boron, ceramic and aramid. Preferred fibres are carbon and glass fibres particularly carbon fibres. Hybrid or mixed fibre systems may also be envisaged. The use of cracked (i.e. stretch-broken) or selectively discontinuous fibres may be advantageous to facilitate lay-up of the product and improve its capability of being shaped. Although a unidirectional fibre alignment is preferable, other forms may also be used. Typical textile forms include simple textile fabrics, knit fabrics, twill fabrics and satin weaves. It is also possible to envisage using non-woven or non-crimped fibre layers. The surface mass of fibres within the fibrous reinforcement is generally 80-4000 g/m$^2$, preferably 100-2500 g/m2, and especially preferably 150-2000 g/m$^2$. The number of carbon filaments per tow can vary from 3000 to 320,000, again preferably from 6,000 to 160,000 and most preferably from 12,000 to 48,000. For fibreglass reinforcements, fibres of 600-2400 tex are particularly adapted.

Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used such as those containing about 25,000 filaments available from Toray and those containing about 50,000 filaments available from Zoltek. The tows typically have a width of from 3 to 7 mm and are fed for impregnation on equipment employing combs to hold the tows and keep them parallel and unidirectional.

The invention is illustrated by the following Examples in which the resins used were Araldite® LY 1556* an unmodified liquid epoxy resin available from Huntsman which has the following properties

| | | |
|---|---|---|
| Aspect (visual | Clear, pale yellow liquid | |
| Viscosity at 25° C. (ISO 9371B) | 11000 to 13000 | mPa s |
| Flash point (ISO 2719) | >200 | ° C. |
| Epoxide equivalent weight | 182-192 | |
| Density at 25° C. (ISO 1675) | 1.15-1.20 | g/cm$^3$ |

Araldite® MY 0610 which is a glycidyl amine based liquid epoxy resin commercially available from Huntsman having the following properties

| | | |
|---|---|---|
| Density at 25° C. (ISO 1675) | 1.18 | g/cm$^3$ |
| Epoxy equivalent weight EEW (ISO 3001) | 95-102 | g/eq |
| Viscosity dynamic at 25° C. Falling-ball (ISO 12058-1) | 550-850 | mPa s |

LY3581 a liquid epoxy resin available from Huntsman Advanced Materials having an epoxy equivalent weight from 165 to 175, a viscosity at 25° C. of 900-1400 mPa and based on bisphenol F epoxy resins.

In the Examples

'Dynamic scanning calorimetry (DSC) was performed using a TA Q100 instrument to determine onset temperatures, enthalpy and residual cure using a heating rate of 10° C./min.' (for onset and enthalpy.)

'Dynamic mechanical analysis (DMA) was performed using a TA Q800 instrument on cured resin to determine glass transition temperatures at a heating rate of 5° C./min and at a frequency of 1 Hz' to provide E' Tg and wet E' Tg.

'Hot/wet resistance was determined of the neat resin by immersing cured DMA specimens in a water bath for two weeks at 70° C. Water uptake and Tg were then determined' (for conditioning samples for wet Tg).

'Compression modulus was performed using an Instron mechanical test machine on neat resin cylinders (6 cm long 1-1.5 cm in diameter) that were machined to parallel ends' (for neat resin modulus).

Example 1

Various amino benzoates were tested which were blended with the MY 0610 epoxy resin in the following proportions 29.1 g of 1,3-pBABB with 30.9 g of MY0610 mixed at 100° C.

6.28 g of 1,3-mBABB with 6.66 g of MY0610 mixed at 60° C.

28.3 g of 1,2-pBABB with 30.0 g of MY0610 mixed at 120° C.

9.41 g of 1,3-pBABAB with 10.05 g of MY0610 mixed at 120° C.

5.34 g of 1,4-pBABAB with 5.70 g of MY0610 mixed at 100° C.

9.63 g of 1,4-pBABB with 10.23 g of MY0610 mixed at 120° C.

17.4 g of 1,3,5-pTABB with 20.0 g of MY0610 mixed at 100° C.

26.1 g of 1,2,3-pTABB with 30.0 g of MY0610 mixed at 100° C.

20.7 g of 1-pABB-3-pABA with 22.0 g of MY0610 mixed at 100° C.

and cured by heating for one hour at 130° C. and then for two hours at 180° C.

These above formulations were compared with the resin containing an equivalent amount of 4,4,'-diamino diphenyl sulfone (DDS) as curative. This formulation was also cured by heating for one hour at 130° C. and then for two hours at 180° C. The results are as follows:

TABLE 1

| Para Amino Benzoate | Onset of cure (° C.) | Enthalpy (J/g) | E'Tg (° C.) | Wet Tg (° C.) | Water uptake (%) | Compression Modulus (GPa) |
|---|---|---|---|---|---|---|
| 1,3-pBABB | 165 | 594 | 200 | 136 | 3.13 | 4.10 |
| 1,3-mBABB | 152 | 556 | 180 | 132 | 2.62 | 4.42 |
| 1,2-pBABB | 174 | 521 | 200 | 123 | 3.16 | 4.14 |
| 1,3-pBABAB | 165 | 517 | 212 | 146 | 5.28 | n/a |
| 1,4-pBABAB | 217 | 577 | n/a-poor Solubility in resin | n/a | n/a | n/a |
| 1,3,5-pTABB | 170 | 553 | 212 | 128 | 2.91 | 4.48 |
| 1,2,3-pTABB | 190 | 542 | 218 | n/a | n/a | n/a |
| 1-pABA-3-p-ABB | 156 | 543 | 211 | 142 | 4.85 | 4.49 |
| 4,4'-DDS | 177 | 720 | 215 | 125 | 5.06 | 4.40 | n/a = not available

Example 2

1,2-, 1,3-, 1,4-Phenylene bis(4-aminobenzoate) pBABB, 1,4-phenylene bis(4-aminobenzamide) 1,4-pBABAB and 1,3,5-pTABB are dispersed in a 1:1 stoichiometry in various epoxy resins as listed in the below Tables 2 to 6 and cured by heating for one hour at 130° C. and then for two hours at 180° C. When using 1,3-pBABB the wet $T_g$ of the system fell by approximately 80° C. after an uptake of 3.13 weight percent of water. Compression modulus was measured at 4.1 GPa. Outlife of the formulation is good, after approximately 5 weeks the enthalpy of cure had dropped from 594 to 547 Jg$^{-1}$ with the mixture retaining its physical consistency over this time.

The results were as follows

TABLE 2

| Epoxy with 1,3-pBABB | Onset of cure (° C.) | Enthalpy (J/g) | E' Tg (° C.) | Wet Tg (° C.) | Water uptake (%) | Compression Modulus (GPa) |
|---|---|---|---|---|---|---|
| LY1556 | 156 | 376 | 150 | | | |
| LY3581 | 156 | 452 | 147 | | | |
| MY0610 | 165 | 594 | 200 | 136 | 3.13 | 4.10 |

1,3-mBABB gave similar reactivities but $T_g$s of approximately 20° C. lower than its para equivalent. 1,2-pBABB gave very similar properties to the 1,3-pBABB amine in terms of $T_g$s and compression and lower values in terms of enthalpy and the onset to cure is between 10 and 20° C. higher.

The results were as follows

TABLE 3

| Epoxy with 1,2-pBABB | Onset of cure (° C.) | Enthalpy (J/g) | E' Tg (° C.) | Wet Tg (° C.) | Water uptake (%) | Compression Modulus (GPa) |
|---|---|---|---|---|---|---|
| LY1556 | 174 | 337 | 157 | | | |
| LY3581 | 173 | 379 | 154 | | | |
| MY0610 | 174 | 521 | 200 | 123 | 3.16 | 4.14 |

1,4-pBABB and the amide equivalent, 1,4-pBABAB were dispersed in the resins at 80-100° C. DSC showed the onset of cure for the 1,4-amines to be higher than that of the 1,3- and 1,2-pBABBs.

The results were as follows

TABLE 4

| Epoxy with 1,4-pBABAB | Onset of cure (° C.) | Enthalpy (J/g) |
|---|---|---|
| LY1556 | 240 | 319 |
| LY3581 | 222 | 322 |
| MY0610 | 217 | 577 |

TABLE 5

| Epoxy with 1,4-pBABB | Onset of cure (° C.) | Enthalpy (J/g) | % cure |
|---|---|---|---|
| LY1556 | 225 | 335 | 74 |
| LY3581 | 223 | 380 | 82 |
| MY0610 | 210 | 553 | 100 |

1,3.5-pTABB is a trifunctional amine, it is 1,3-pBABB with an additional aminobenzoate group at the 5 position on the central benzene ring. $T_g$'s for the bisphenol epoxies were found to be similar to that of 1,2- and 1,3-pBABB. The $T_g$ with MY0610 was over 10° C. higher than for the pBABBs. The results were as follows

TABLE 6

| Epoxy with 1,3,5-pTABB | Onset of cure (° C.) | Enthalpy (J/g) | E'Tg (° C.) | Wet Tg (° C.) | Water uptake (%) | Compression Modulus (GPa) |
|---|---|---|---|---|---|---|
| LY1556 | 175 | 303 | 150 | | | |
| LY3581 | 171 | 415 | 153 | | | |
| MY0610 | 170 | 553 | 212 | 128 | 2.91 | 4.48 |

The following Table 7 collects the data of the use of the various amino benzoates as curatives for the epoxy resin MY 0610.

TABLE 7

| Amine | Onset of cure (° C.) | Enthalpy (J/g) | E' Tg (° C.) | Wet Tg (° C.) | Water uptake (%) | Compression Modulus (GPa) |
|---|---|---|---|---|---|---|
| 1,3-pBABB | 165 | 594 | 200 | 136 | 3.13 | 4.10 |
| 1,3-mBABB | 152 | 556 | 180 | 132 | 2.62 | 4.42 |
| 1,2-pBABB | 174 | 521 | 200 | 123 | 3.16 | 4.14 |
| 1,3-pBABAB | 165 | 517 | 212 | 146 | 5.28 | n/a |
| 1,4-pBABB | 210 | 553 | n/a | n/a | n/a | n/a |
| 1,4-pBABAB | 217 | 577 | n/a | n/a | n/a | n/a |
| 1,3,5-pTABB | 170 | 553 | 212 | 128 | 2.91 | 4.48 |
| 1,2,3-pTABB | 190 | 542 | 218 | n/a | n/a | n/a |

TABLE 7-continued

| Amine | Onset of cure (° C.) | Enthalpy (J/g) | E' Tg (° C.) | Wet Tg (° C.) | Water uptake (%) | Compression Modulus (GPa) |
|---|---|---|---|---|---|---|
| 1-pABA-3-p-ABB | 156 | 543 | 211 | 142 | 4.85 | 4.49 | n/a = not available

When the uncured epoxy resin fibrous system is a prepreg the prepreg may be rolled-up, so that it can be stored for a period of time. It can then be unrolled and cut as desired and optionally laid up with other prepregs to form a prepreg stack in a mould or in a vacuum bag which is subsequently placed in a mould and cured.

The prepregs are produced by impregnating the fibrous material with the epoxy resin formulation of this invention. In order to increase the rate of impregnation, the process is preferably carried out at an elevated temperature so that the viscosity of the resin is reduced. However it must not be so hot for a sufficient length of time that premature curing of the resin occurs. Thus, the impregnation process is preferably carried out at temperatures in the range of from 40° C. to 80° C.

In the process to manufacture prepregs the resin/amino benzoate and/or amino benzamide formulation of this invention can be spread onto the external surface of a roller and coated onto a paper or other backing material to produce a layer of curable resin. The resin can then be brought into contact with the fibrous layer for impregnation perhaps by the passage through rollers. The resin may be present on one or two sheets of backing material, which are brought into contact with the structural fibrous layer and by passing them through heated consolidation rollers to cause impregnation. Alternatively the resin can be maintained in liquid form in a resin bath either being a resin that is liquid at ambient temperature or being molten if it is a resin that is solid or semi-solid at ambient temperature. The liquid resin can then be applied to a backing employing a doctor blade to produce a resin film on a release layer such as paper or polyethylene film. The structural fibrous layer may then be placed into the resin and optionally a second resin layer may be provided on top of the fibrous layer.

A backing sheet can be applied either before or after impregnation of the resin. However, it is typically applied before or during impregnation as it can provide a non-stick surface upon which to apply the pressure required for causing the resin to impregnate the fibrous layer.

Once it is created in the mould the prepreg or prepreg stack may be cured by exposure to an externally applied elevated temperature usually in the range 70° C. to 110° C., and optionally elevated pressure, to produce a cured laminate.

The exotherm due to the curing of the prepreg stack may take the temperatures within the stack to above 110° C., however we have found that if the externally applied temperature is within the range of 70° C. to 110° C., curing of a prepreg or stack of prepregs based on an epoxy resin of EEW from 150 to 1500 particularly of EEW from 200 to 500 can be accomplished at a temperature of about 150° C. in less than 150 seconds to provide a cured resin having a Tg of between 130 and 150° C. and a Phase angle at 140° C. of 20° or lower so that the cured article can be removed from the mould without undue delay.

Curing at a pressure close to atmospheric pressure can be achieved by the so-called vacuum bag technique. This involves placing the prepreg or prepreg stack in an air-tight bag and creating a vacuum on the inside of the bag, the bag may be placed in a mould prior or after creating the vacuum and the resin then cured by externally applied heat to produce the moulded laminate. The use of the vacuum bag has the effect that the prepreg stack experiences a consolidation pressure of up to atmospheric pressure, depending on the degree of vacuum applied.

Alternatively the resin may be employed in the infusion process when the fibrous material is first placed in the mould and the liquid resin is drawn into the mould perhaps under pressure or by vacuum to encase the fibrous material within the mould. The fibrous material may have been preshaped in the mould or maybe shaped once impregnated with the resin and the resin impregnated fibrous material may then be cured in the mould.

Upon curing, the prepreg, prepreg stack, infused fibrous material or layers thereof become a composite laminate, suitable for use in a structural application, such as for example an automotive, marine vehicle or an aerospace structure or a wind turbine structure such as a shell for a blade or a spar or in sporting goods such as skis. Such composite laminates can comprise structural fibres at a level of from 80% to 15% by volume, preferably from 58% to 65% by volume.

particularly useful as curatives in prepregs.

The invention claimed is:

1. An epoxy resin formulation which consists of a difunctional epoxy resin or a trifunctional epoxy resin and a sufficient amount of a curing agent to provide onset of curing of said epoxy resin formulation in the range of temperatures from 152° C. to 175° C. said curing agent being selected from the group consisting of an amino benzoate or amino benzamide having the following formulas:

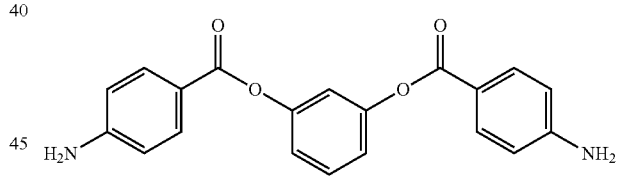

and counterparts in which the amino group is in the meta position;

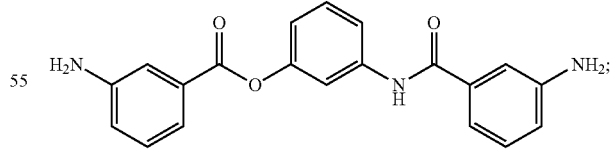

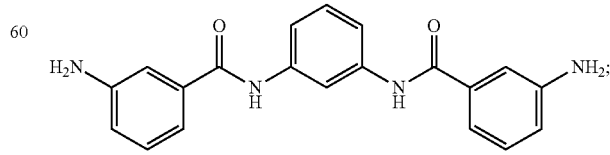

and

-continued
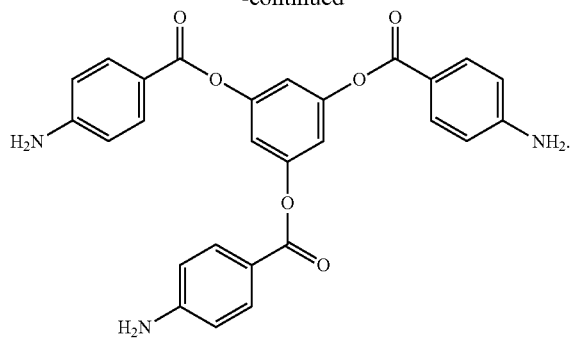
2. An epoxy resin formulation according to claim 1 wherein said epoxy resin formulation consists of said difunctional epoxy resin and said curing agent.
3. An epoxy resin formulation according to claim 1 wherein said epoxy resin formulation consists of said trifunctional epoxy resin and said curing agent.
* * * * *